(12) United States Patent
Yoon et al.

(10) Patent No.: US 11,790,541 B2
(45) Date of Patent: Oct. 17, 2023

(54) METHOD AND APPARATUS WITH TARGET OBJECT TRACKING

(71) Applicant: SAMSUNG ELECTRONICS CO., LTD., Suwon-si (KR)

(72) Inventors: Jonghoon Yoon, Hwaseong-si (KR); Dongwook Lee, Suwon-si (KR); Changyong Son, Anyang-si (KR); Byung In Yoo, Seoul (KR); Seohyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 17/385,455

(22) Filed: Jul. 26, 2021

(65) Prior Publication Data
US 2022/0301188 A1   Sep. 22, 2022

(30) Foreign Application Priority Data
Mar. 17, 2021   (KR) ................. 10-2021-0034804

(51) Int. Cl.
*G06T 7/246* (2017.01)
*G06V 10/75* (2022.01)
(Continued)

(52) U.S. Cl.
CPC ............. *G06T 7/248* (2017.01); *G06F 18/22* (2023.01); *G06V 10/751* (2022.01);
(Continued)

(58) Field of Classification Search
CPC ................ G06T 7/248; G06T 2200/24; G06T 2207/20084; G06T 2207/20104;
(Continued)

(56) References Cited

U.S. PATENT DOCUMENTS 10,275,709 B2    4/2019  Munteanu et al.
2020/0402630 A1* 12/2020 Sudharsan ............... G06N 5/04

FOREIGN PATENT DOCUMENTS

CN     109284749 A    1/2019
JP     9-282460 A    10/1997
(Continued)

OTHER PUBLICATIONS

Riaz, et al. "Deep fMRI: An end-to-end deep network for classification of fMRI data." 2018 *IEEE 15th International Symposium on Biomedical Imaging (ISBI 2018)*. IEEE, 2018. (4 pages in English).
(Continued)

*Primary Examiner* — Stephen P Coleman
(74) *Attorney, Agent, or Firm* — NSIP Law

(57) ABSTRACT

A processor-implemented method of tracking a target object includes: extracting a feature from frames of an input image; selecting one a neural network model from among a plurality of neural network models that is provided in advance based on a feature value range, based on a feature value of a target object that is included in the feature of a previous frame among the frames; and generating a bounding box of the target object included in a current frame among the frames, based on the selected neural network model.

24 Claims, 9 Drawing Sheets

(51) Int. Cl.
*G06F 18/22* (2023.01)
*H04N 23/63* (2023.01)

(52) U.S. Cl.
CPC ....... *H04N 23/632* (2023.01); *G06T 2200/24* (2013.01); *G06T 2207/20084* (2013.01); *G06T 2207/20104* (2013.01); *G06T 2207/20132* (2013.01); *G06V 10/759* (2022.01)

(58) Field of Classification Search
CPC . G06T 2207/20132; G06T 2207/20081; G06T 7/246; G06T 7/11; G06T 2210/12; G06F 18/22; G06V 10/751; G06V 10/759; G06V 10/25; G06V 10/82; H04N 23/632; G01S 5/16; G06N 3/08
USPC ........................................................ 382/103
See application file for complete search history.

(56) References Cited

FOREIGN PATENT DOCUMENTS

| KR | 10-1912569 B1 | 10/2018 |
| KR | 10-2020-0091324 A | 7/2020 |
| WO | WO 2019/203851 A1 | 10/2019 |

OTHER PUBLICATIONS

Bertinetto, Luca, et al. "Fully-Convolutional Siamese Networks For Object Tracking." Computer Vision—ECCV 2016 Workshops: Amsterdam, The Netherlands, Oct. 8-10 and 15-16, 2016, Proceedings, Part II 14. Springer International Publishing, arXiv:1606.09549v2, Sep. 14, 2016. pp. 1-16.

Korean Office Action dated Aug. 1, 2023, in corresponding Korean Patent Application No. 10-2021-0034804 (3 pages in English, 7 pages in Korea).

* cited by examiner

METHOD AND APPARATUS WITH TARGET OBJECT TRACKING

CROSS-REFERENCE TO RELATED APPLICATIONS

This application claims the benefit under 35 USC § 119(a) of Korean Patent Application No. 10-2021-0034804 filed on Mar. 17, 2021, in the Korean Intellectual Property Office, the entire disclosure of which is incorporated herein by reference for all purposes.

BACKGROUND

1. Field

The following description relates to a method and apparatus with a target object tracking.

2. Description of Related Art

As the shape and ratio of objects included in an input image become more diversified, a processing load of a neural network used for accurate tracking may increase. To recognize and/or detect the objects of the various shapes, a single large network with a great depth of a deep neural network (DNN) may be used or a plurality of trackers may be used. However, using the large single network or the trackers may increase a memory usage amount and/or increase a multiply-accumulate (MAC) operation, and thus accurate real-time tracking may not be achieved in a device having a limited memory and/or processor (such as, for example, a mobile device).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of tracking a target object includes: extracting a feature from frames of an input image; selecting a neural network model from among a plurality of neural network models provided in advance based on a feature value range, based on a feature value of a target object that is included in the feature of a previous frame among the frames; and generating a bounding box of the target object included in a current frame among the frames, based on the selected neural network model.

The extracting of the feature may include: in response to the current frame being a first frame including the target object among the frames, extracting, from the first frame, a feature of a region cropped based on a selection by a user.

The extracting of the feature may include: in response to the current frame not being a first frame including the target object among the frames, extracting, from the current frame, a feature of a region cropped based on a bounding box generated from the previous frame.

The feature value of the target object may correspond to any one or any combination of any two or more of a size of the target object, an aspect ratio of the target object, a type of the target object, a degree of a movement change of the target object, a type of a movement of the target object, a color of the target object, a rigidity of the target object, and an intensity of illumination.

The selecting of the neural network model may include: processing the feature value of the target object; and selecting, based on the processed feature value, the neural network model from among the plurality of neural network models provided in advance based on the feature value range that is a processed feature value range.

The neural network models may include: a first neural network model trained to determine a target object corresponding to a first feature value range; a second neural network model trained to determine a target object corresponding to a second feature value range; and a third neural network model trained to determine a target object corresponding to a third feature value range.

The first feature value range, the second feature value range, and the third feature value range may differ from one another.

The selected neural network model may be configured to process a target object corresponding to a range of a portion of feature values of the target object.

The generating of the bounding box of the target object may include: cropping the current frame using the selected neural network model; determining a similarity between a template feature that is based on the feature extracted from the previous frame and a feature that is extracted from a cropped image of the current frame, using the selected neural network model; and determining a bounding box of the target object that indicates a region matching the template feature in the feature extracted from the cropped image of the current frame, based on the similarity.

The method may include: receiving, as an input, a selection of the target object from a user.

A non-transitory computer-readable storage medium may store instructions that, when executed by a processor, configure the processor to perform the method.

In another general aspect, an apparatus for tracking a target object includes: a communication interface configured to obtain an input image; and a processor configured to extract a feature from frames of the input image, select a neural network model from among a plurality of neural network models provided in advance based on a feature value range using a feature value of a target object included in a feature of a previous frame among the frames, and generate a bounding box of the target object included in a current frame among the frames using the selected neural network model.

For the extracting of the feature, the processor may be configured to: in response to the current frame being a first frame including the target object among the frames, extract, from the first frame, a feature of a region cropped based on a selection by a user.

For the extracting of the feature, the processor may be configured to: in response to the current frame not being a first frame including the target object among the frames, extract, from the current frame, a feature of a region cropped based on a bounding box generated from the previous frame.

For the selecting of the neural network model, the processor may be configured to: process the feature value of the target object; and select, based on the processed feature value, the neural network model from among the plurality of neural network models provided in advance based on the feature value range that is a processed feature value range.

The neural network models may include a first neural network model trained to determine a target object corresponding to a first feature value range, a second neural network model trained to determine a target object corresponding to a second feature value range, and a third neural network model trained to determine a target object corresponding to a third feature value range, and the first feature value range, the second feature value range, and the third feature value range may differ from one another.

For the generating of the bounding box of the target object, the processor may be configured to: crop the current frame using the selected neural network model; determine a similarity between a template feature that is based on the feature extracted from the previous frame and a feature that is extracted from a cropped image of the current frame, using the selected neural network model; and determine the bounding box of the target object that indicates a region matching the template feature in the feature extracted from the cropped image of the current frame based on the determined similarity.

The apparatus may be an electronic apparatus comprising: a camera configured to generate the input image; and a user interface (UI) configured to receive, as an input, a selection of the target object included in the input image from a user.

In another general aspect, an electronic apparatus includes: a camera configured to generate an input image based on sensed visual information; a user interface (UI) configured to receive, as an input, a selection of a target object included in the input image from a user; and a processor configured to extract a feature from frames of the input image, select a neural network model from among a plurality of neural network models provided in advance based on a feature value range using a feature value of the target object included in a feature of a previous frame among the frames, and track the target object using a bounding box of the target object included in a current frame that is generated using the selected neural network model.

For the extracting of the feature, the processor may be configured to: in response to the current frame being a first frame including the target object among the frames, extract, from the first frame, a feature of a region cropped based on a selection by the user; and in response to the current frame not being the first frame including the target object among the frames, extract, from the current frame, a feature of a region cropped based on a bounding box generated from the previous frame.

For the generating of the bounding box of the target object, the processor may be configured to: crop the current frame using the selected neural network model; determine a similarity between a template feature that is based on the feature extracted from the previous frame and a feature that is extracted from a cropped image of the current frame, using the selected neural network model; and determine the bounding box of the target object that indicates a region matching the template feature in the feature extracted from the cropped image of the current frame based on the determined similarity.

In another general aspect, a processor-implemented method of tracking a target object includes: determining a first feature value of a target object included in a first image frame; selecting, from a plurality of neural network models trained for respective feature value ranges, a neural network model trained for a feature value range corresponding to the first feature value; and determining location information of the target object included in a second image frame using the selected neural network model.

The determining of the location information may include: determining a second feature value of the target object included in the second image frame; determining, using the selected neural network model, a similarity between the first feature value and the second feature value; and determining the location information based on the similarity.

The location information may correspond to a bounding box of the target object in the second image frame, and the feature value may correspond to an aspect ratio of a bounding box of the target object in the first image frame.

Other features and aspects will be apparent from the following detailed description, the drawings, and the claims.

Figure 1:
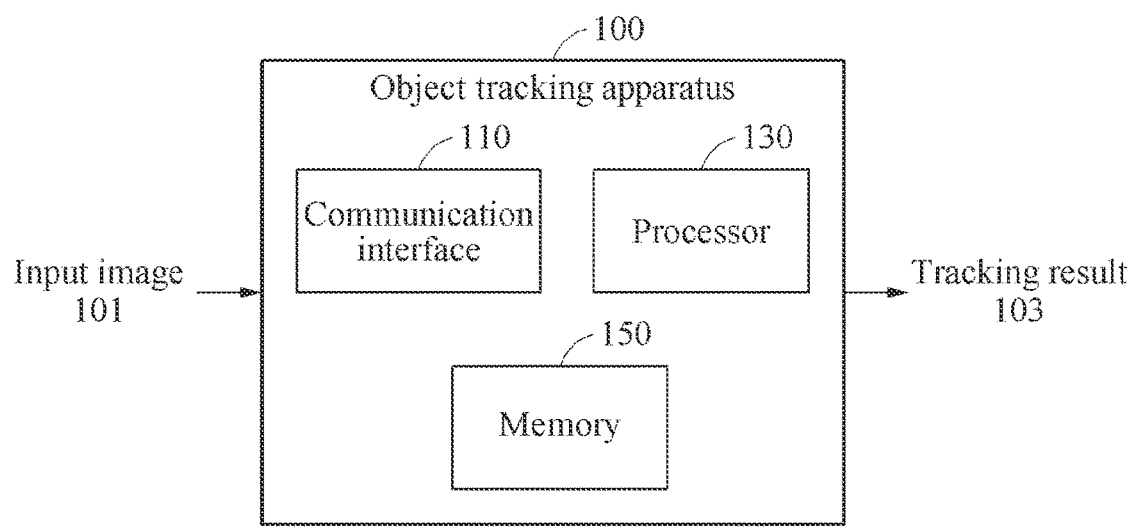
FIG. 1 illustrates an example of an object tracking apparatus.

Throughout the drawings and the detailed description, unless otherwise described or provided, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of an object tracking apparatus. Referring to FIG. 1, an object tracking apparatus 100 may include a communication interface 110, a processor 130 (e.g., one or more processors), and a memory 150 (e.g., one or more memories).

The object tracking apparatus 100 may track a target object in an input image 101 and output a bounding box that corresponds to, and/or is included in, a tracking result 103 from tracking the target object. The target object may be an object that is a target to be tracked among objects included in frames of the input image 101. The target object may be determined by a selection from the input image 101 by a user, but examples of which are not limited thereto.

The communication interface 110 may obtain the input image 101. The input image 101 may include a plurality of image frames. For example, the input image 101 may include a previous frame and a current frame that is subsequent to the previous frame. The input image 101 may include the frames that are successive time-sequentially.

The processor 130 may extract a feature from the frames of the input image 101. For example, in a case in which a corresponding frame is a first frame including the target object among the frames of the input image 101, the processor 130 may extract, from the first frame, a feature of a cropped region which is a region cropped based on a selection by the user. Furthermore, even in a case in which the frame is not the first frame including the target object among the frames of the input image 101, the processor 130 may extract a feature of a cropped region which is a region cropped from the frame based on a bounding box generated from a previous frame. A feature described herein may include, for example, a size of an object included in frames, an aspect ratio of the object, a type of the object, a degree of a movement change of the object, a type of a movement of the object, a color of the object, a rigidity of the object, an illumination of a frame, and the like. The feature may further include dynamic characteristics of the object, for example, a size change, a shape change, and a location change of the object, and the like. The size change may indicate a degree of a change in the size of the object compared to an initial size. The shape change may indicate a degree of a change in the shape of the object compared to an initial shape. The location change may indicate a degree of a change in the location of the object compared to an initial location. The location change may also be referred to as a movement that includes a movement speed and/or movement direction.

The feature may be provided in a form of, for example, a feature map or a feature vector, but examples of which are not limited thereto.

The processor 130 may predict a movement of an object based on a difference between a previous reference location by a bounding box generated from a previous frame and a current reference location of the object in a current frame.

A region corresponding to the target object in the input image 101 may be specified by the bounding box corresponding to the tracking result 103 of the object tracking apparatus 100.

The processor 130 may select a neural network model from among a plurality of neural network models that are provided in advance based on a feature value range, based on a feature value of the target object that is included in the feature of the previous frame among the frames.

The feature value of the target object may be a value corresponding to at least one of, for example, a size of the target object, an aspect ratio of the target object, a type of the target object, a degree of a movement change of the target object, a type of a movement of the target object, a color of the target object, a rigidity of the target object, an illumination, and the like. The degree of a movement change of the target object may correspond to a degree of a dynamic movement of the target object. For example, in a case of a large movement, the degree of a movement change of the target object may have a high feature value. Further, in a case of a small movement, the degree of a movement change of the target object may have a low feature value. The type of a movement of the target object may correspond to a classification of a movement or motion performed by the target object. For example, in a case in which the input image 101 is a video of a person riding a bicycle or a video of a person dancing, the type of a movement in the input image 101 may be classified into a bicycle riding motion or a dancing motion. A feature value corresponding to a movement or motion of which the type is classified may be set in advance. The color of the target object may have a feature value corresponding to at least one or a combination of color, brightness, and saturation of the target object. For example, the target object may have a low feature value when the color is unclear and/or dark, and have a high feature value when the color is clear and/or bright. The rigidity of the target object may vary based on whether the target object is a deformable fluid such as water or oil, an elastic body such as a rubber ball that is deformable by an external force, or a rigid body such as wire or stone that is not deformable. For example, in a case in which the target object is or is similar to a fluid, the target object may have a low feature value of the feature (that is, rigidity). Further, in a case in which the target object is or is similar to a rigid body, the target object may have a high feature value of the rigidity.

The neural network model provided (e.g., determined or trained) in advance based on the feature value range may include, for example, a first neural network model that is trained to propose (e.g., detect or determine location information of) a target object corresponding to a first feature value range, a second neural network model that is trained to propose a target object corresponding to a second feature value range, and a third neural network model that is trained to propose a target object corresponding to a third feature value range, but examples of which are not limited thereto (e.g., there may be N neural networks each corresponding to a respective feature value range among N feature value ranges, where N is any integer greater than or equal to 1). The first feature value range may be greater than the second feature value range, and the second feature value range may be greater than the third feature value range, but the opposite may also be possible. The first feature value range, the second feature value range, and the third feature value range may differ from one another. For example, in a case in which the feature corresponds to an aspect ratio of a target object, the first neural network model may be one that is trained to propose a target object of which an aspect ratio value is greater than 5 in the input image 101. The second neural network model may be one that is trained to propose a target object of which an aspect ratio value is greater than 2.5 and less than or equal to 5 in the input image 101. In addition, the third neural network model may be one that is trained to propose a target object of which an aspect ratio value is greater than 0 and less than or equal to 2.5 in the input image 101.

The neural network models may share at least a portion of weights in that they are based on different feature values for a same feature. Although to be described hereinafter, a neural network model among the neural network models may be variably selected based on the feature value range. The neural network models may be stored in the memory 150.

Each of the neural network models may include a region proposal network (RPN). The RPN may output an object proposal in a form of a quadrangular box and an objectness score from the input image 101. The neural network models may each obtain a proposed (or determined) region (e.g., a quadrangular box region) corresponding to a potential region in which an object is predicted to be present through the RPN, and transfer the proposed region to a region of interest (ROI) pooling layer of the neural network. An output of the RPN may be a set of quadrangular boxes including objectness scores of respective proposed regions. A neural network model described herein may include a fully convolutional network (FCN).

The RPN may receive, as an input, a final feature map of the convolution network, and then perform a sliding window convolution operation of an n×n size to generate a 256-dimensional vector or a 512-dimensional vector, for example. The RPN may connect (or input) the 256-dimensional vector or the 512-dimensional vector to a box classification layer of the RPN that indicates objectness and a box regression layer of the RPN that generates coordinates of a candidate region. The box classification layer may calculate 2 k objectness scores when it obtains an objectness score indicating whether k candidate objects is a target object or not (e.g., an objectness score indicating a likelihood that a candidate object is a target object and an objectness score indicating a likelihood that the candidate object is not the target object may be calculated for each of the k candidate objects). The box regression layer may output 4 k coordinates when it outputs four coordinates (x, y, w, h) for each object. The four coordinates (x, y, w, h) may include center coordinates (x, y), a width (w), and a height (h) of a bounding box.

Alternatively, each of the neural network models may be a deep neural network (DNN) including a plurality of layers, and referred to herein as a neural network. The layers may include an input layer, one or more hidden layers, and an output layer. The neural network may include an FCN, a convolutional neural network (CNN), and/or a recurrent neural network (RNN). For example, a portion of the layers in the neural network may correspond to the CNN, and another portion of the layers may correspond to the FCN. In this example, the CNN may be referred to as a convolutional layer and the FCN may be referred to as a fully connected layer.

In a case of the CNN, data input to each layer may be referred to as an input feature map, and data output from each layer may be referred to as an output feature map. The input feature map and the output feature map may be collectively referred to as activation data. For example, in a case in which the convolutional layer is the input layer, the input feature map of the input layer may be the input image 101.

After being trained based on deep learning, a neural network model may map input data and output data that are in a nonlinear relationship to perform an inference suitable for a purpose of training. Deep learning may be a machine learning method used to solve an issue such as image or speech recognition from a big dataset. Deep learning may be construed as an optimization problem-solving process for finding a point at which energy is minimized while training a neural network using prepared training data.

Deep learning may include supervised or unsupervised learning, through which an architecture of the neural network or a weight corresponding to the model may be obtained. Through the weight, the input data and the output data may be mapped to each other. When a width and depth of the neural network are sufficiently large, the neural network may have a capacity sufficient to implement a function. When the neural network learns a sufficiently great amount of training data through a suitable training process, optimal performance may be achieved.

The neural network may be described herein as being trained "in advance." Such an expression may indicate "before" the neural network begins. That the neural network begins may indicate that the neural network is ready for an inference. For example, that the neural network begins may include a state in which the neural network is loaded in a memory or input data for an inference is input to the neural network after the neural network is loaded in the memory.

The processor 130 may provide a result of tracking the target object by generating a bounding box of the target object included in a current frame based on the selected neural network model. For example, the processor 130 may crop the current frame using the selected neural network model. The processor 130 may measure a similarity between a template feature that is based on the feature extracted from the previous frame and a feature extracted from a cropped image from the current frame, using the selected network model. The processor 130 may determine the bounding box of the target object that indicates a region matching the template feature in the feature extracted from the cropped image of the current frame based on the similarity. Non-limiting examples of the template feature will be described in further detail below.

The processor 130 may execute instructions to perform operations described herein with reference to FIGS. 1 through 10.

The processor 130 may be a hardware processing device having a physically structured circuit to execute desired operations. The desired operations may include, for example, code or instructions included in a program. The hardware processing device may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), a neural processing unit (NPU), and the like.

The processor 130 may execute the program and control the object tracking apparatus 100. The code of the program to be executed by the processor 130 may be stored in the memory 150.

The memory 150 may include the neural network models described above. The memory 150 may be connected to the processor 130, and store instructions executable by the processor 130 and data to be processed by the processor 130 or data processed by the processor 130. The memory 150 may include a non-transitory computer-readable medium, for example, a high-speed random access memory (RAM) and/or a nonvolatile computer-readable storage medium (e.g., at least one disk storage device or flash memory device, or other nonvolatile solid-state memory devices).

Figure 2:
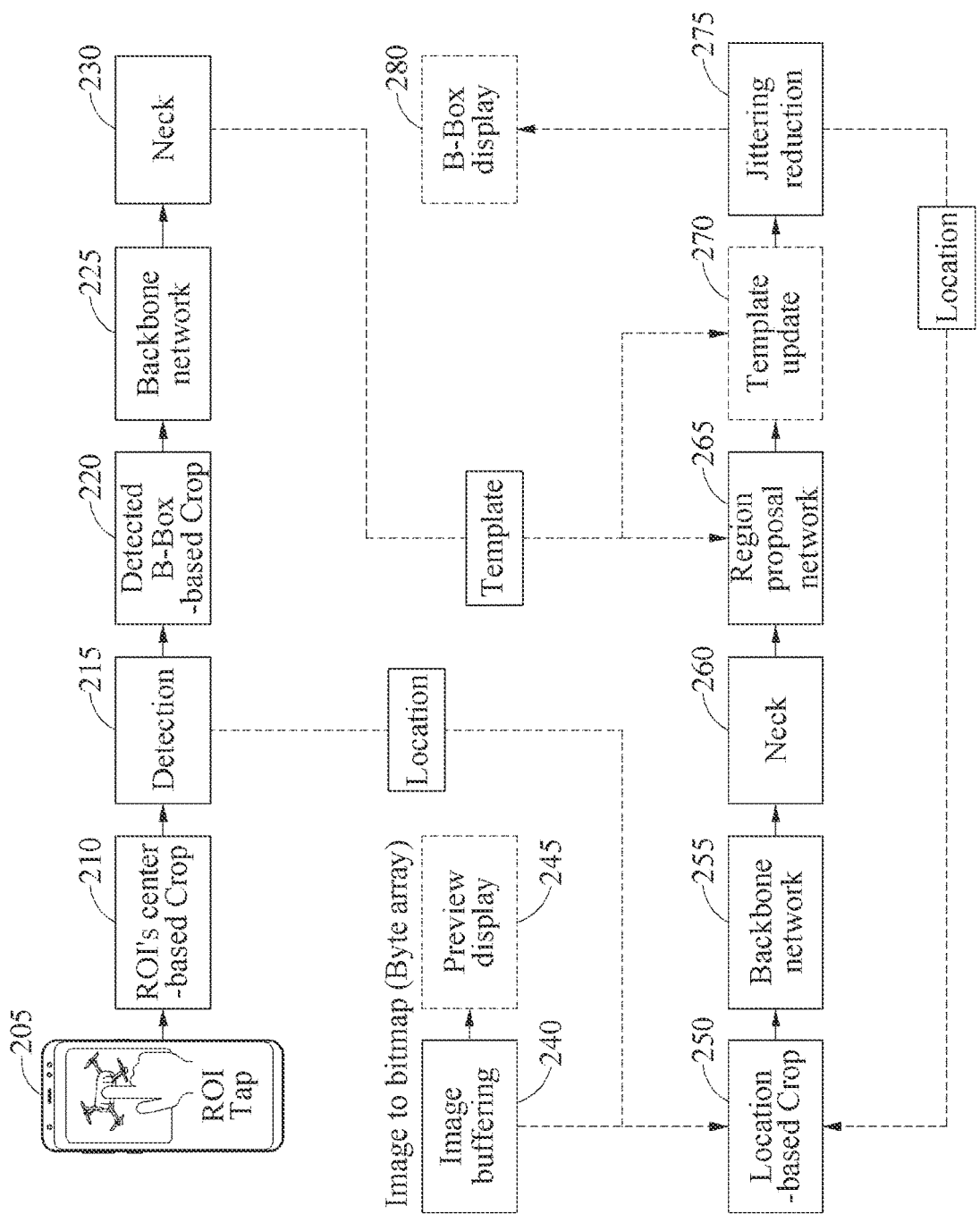
FIG. 2 illustrates an example of a workflow of tracking a target object.

FIG. 2 illustrates an example of a workflow of tracking a target object. The example workflow illustrates how an object tracking apparatus may track a target object in frames of an input image.

The object tracking apparatus may track a target object by performing operations 205 through 230 on a first frame of an input image.

In an example, when a user selects one object to be tracked, for example, a target object (e.g., a drone), from among objects on a screen of a smartphone or a digital camera by tapping the object in operation 205, an ROI corresponding to the target object may be set based on a location of the tapping.

In operation 210, the object tracking apparatus may perform cropping on a first frame based on a center of the ROI. The object tracking apparatus may generate an ROI-based cropped image by cropping the first frame by a preset size (e.g., 255*255*3) based on the center of the ROI.

In operation 215, the object tracking apparatus may detect the target object in the cropped image, and generate a bounding box. A location of the target object in the first frame may be specified by the generated bounding box. For example, a center of the bounding box may be used as a reference location that specifies the location of the target object in the first frame. The object tracking apparatus may determine a bounding box in each frame, and the bounding box in each frame may correspond to an object tracking result. The location of the target object in the first frame that is specified by the bounding box in operation 215 may be transferred to operation 250 of processing a second frame (e.g., where the first frame is previous to the second frame among a plurality of time-sequential frames of the input image).

In operation 220, the object tracking apparatus may perform bounding box-based cropping, or B-box based cropping, based on the bounding box generated in operation 215. The object tracking apparatus may generate a bounding box-based cropped image having the same size as the bounding box by cropping the first frame by the bounding box, or generate a bounding box-based cropped image having a different size (e.g., a greater or smaller size) from that of the bounding box by cropping a region obtained by applying a scale factor to the bounding box. The size of the bounding box-based cropped image may be 127*127*3, for example.

In operation 225, the object tracking apparatus may extract a feature from the bounding box-based cropped image using a backbone network. The backbone network may be, for example, a CNN-based feature extractor or feature extraction neural network, but examples of which are not limited thereto. The feature extracted from the bounding box-based cropped image may be in a form of a feature map.

In operation 230, the object tracking apparatus may perform preprocessing to adjust a dimension of the feature extracted in operation 225, that is, the size of the feature map, through a neck. The object tracking apparatus may generate a template by adjusting the size of the feature map through the neck. For example, the size of the feature map may be 16*16*256, and the size of the template may be 7*7*256. The template may also be referred to herein as a template feature.

The object tracking apparatus may perform operations 240 through 280 on the second frame of the input image.

In operation 240, the object tracking apparatus may retrieve the second frame of the buffered input image. According to examples, in operation 245, the object tracking apparatus may perform preview display of the second frame to be retrieved. Thus, operation 245 may be performed selectively.

In operation 250, the object tracking apparatus may perform cropping on the second frame based on the location of the target object in the first frame that is specified in operation 215. The object tracking apparatus may generate a location-based cropped image by cropping the second frame by a preset size (e.g., 255*255*3) based on the bounding box.

In operation 255, the object tracking apparatus may extract a feature from the location-based cropped image generated in operation 250, using a backbone network. The backbone network used in operation 255 may be the same CNN-based feature extractor or feature extraction neural network that is used in operation 225, but examples are not limited thereto.

In operation 260, the object tracking apparatus may adjust the size of the feature (e.g., a feature map) extracted in operation 255 through a neck. The neck used in operation 260 may be the same neck that is used in operation 230, but examples are not limited thereto.

In operation 265, the object tracking apparatus may perform feature matching between the template feature generated in operation 230 for the second frame (or a current frame) and a feature of which the size is adjusted in operation 260, using a CNN-based RPN. The template or template feature may be generated in operation 230. The RPN may correspond to a plurality of variably usable neural networks, a non-limiting example of which is to be further described hereinafter with reference to FIG. 3. By performing the feature matching in operation 265, the object tracking apparatus may determine a bounding box that indicates a region matching the template in the feature of which the size is adjusted in operation 260. The bounding box may specify a location of the target object in the second frame. A center of the bounding box may be used as a reference location that specifies the location of the target object in the second frame. When the bounding box in the second frame is determined, the object tracking apparatus may track or predict a movement of the target object.

In operation 270, the object tracking apparatus may update the template based on the bounding box determined in operation 265. The object tracking apparatus may update the template based on remaining objects excluding the target object. For example, the object tracking apparatus may predict a movement of an object based on a difference between a previous reference location of a target object in a previous frame (e.g., the first frame) and a current reference location of the target object in a current frame (e.g., the second frame). In this example, a center of a bounding box may be used as the reference locations. The predicted movement may be used to set a crop size in a subsequent frame (e.g., a third frame) and select a neural network model that performs object tracking (e.g., feature extraction and/or feature matching).

In operation 275, the object tracking apparatus may remove a jitter occurring in a result that has passed through the network in operation 265.

The object tracking apparatus may perform operations 250 through 275 on the third frame of the input image based on the object movement. For example, the object tracking apparatus may crop the third frame by selecting one neural network model from among the neural network models that are provided based on the feature value range, based on a feature value of an object included in the feature of the previous frame. The neural network model may be configured to perform feature extraction on a target object of which a feature value changes in the frames, or perform both feature extraction and feature matching on the target object of which the feature value changes. For example, in a case in which the neural network model is configured to perform the feature extraction, the neural network model may correspond to a feature extractor. In a case in which the neural network model is configured to perform the feature extraction and the feature matching, the neural network model may correspond to a combination of a feature extractor, a neck, and a head (e.g., an RPN).

The object tracking apparatus may predict a movement of the target object, and repeatedly perform the operations of performing object tracking on remaining frames adaptively to the movement of the object. A location of a target object in a frame specified by a bounding box based on a result of performing operations 250 through 275 on each frame may be transferred to operation 250 of performing cropping on a subsequent frame.

In operation 280, the object tracking apparatus may display a tracking result (or a bounding box) corresponding to a final result from which the jitter is removed in operation 275.

Figure 3:
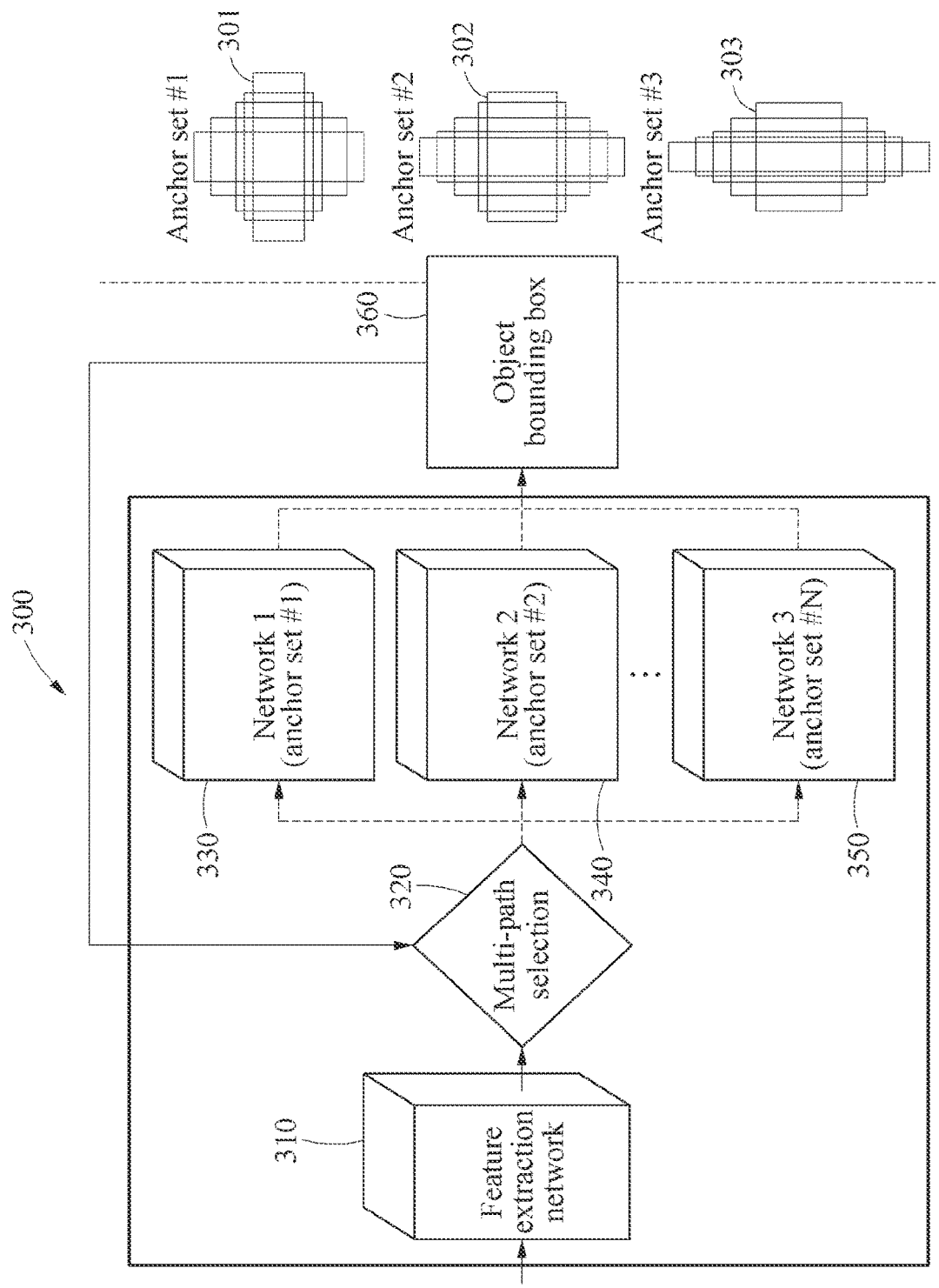
FIG. 3 illustrates an example of a configuration of an object tracking apparatus.

FIG. 3 illustrates an example of a configuration of an object tracking apparatus. In the example of FIG. 3, illustrated is an object tracking apparatus 300 of a multi-path network architecture including a plurality of neural network models 330, 340, and 350.

The object tracking apparatus 300 includes the neural network models 330, 340, and 350. Each of the neural network models 330, 340, and 350 may be a similarity measure network (SMN) that is trained to measure a similarity between features of different frames.

Each of the neural network models 330, 340, and 350 may be an object tracking network configured to enable selective use of one neural network model through a selection circuit 320 that selects one from among multiple paths.

The object tracking apparatus 300 may determine a bounding box 360 in which a target object is to be tracked by variably selecting one similarity measure network to be used for tracking in a current frame from among the neural network models 330, 340, and 350 using an object feature estimated from a previous frame by a feature extraction network 310. The feature extraction network 310 may be configured in an architecture that shares a backbone network (e.g., the backbone network 255 of FIG. 2) that extracts a feature from a frame of an input image.

For example, the first neural network model 330 may correspond to a first anchor set 301 (anchor set #1 as illustrated), the second neural network model 340 may correspond to a second anchor set 302 (anchor set #2 as illustrated), and the third neural network model 350 may correspond to a third anchor set 303 (anchor set #3 as illustrated). An anchor set described herein may be a set of quadrangular anchor boxes of various sizes to be used as candidates for a bounding box at each location of a sliding window. Intuitively, a neural network model may extract a feature by applying quadrangular anchor boxes of various ratios/sizes defined in advance based on a window location while moving the sliding window of the same size.

One of the neural network models 330, 340, and 350 may intensively process (e.g., detect or determine location information of) a target object having a feature value corresponding to a portion of a range of all feature values that a feature of the target object has. For example, a similarity measure network (for example, the third neural network model 350) may process target objects having a partial range (a range of aspect ratios greater than 5) of an entire range of various aspect ratio values (e.g., aspect ratio values greater than 0 and less than or equal to 10).

In an example, by variably using one of the neural network models 330, 340, and 350, a relatively densely distributed group in terms of data distribution may be processed after being received as an input, and object tracking performance may thus be improved. In addition, respective final output portions of the neural network models 330, 340, and 350 may be differently configured to be more suitable to a narrowed partial range of target object feature values, and the object tracking performance may thus be improved.

In a case in which a single neural network model is provided, a universal anchor set may be needed to encompass an entire feature value range. However, in an example, each of the neural network models 330, 340, and 350 may have an anchor set that is more suitable to a portion of a range of target object feature values, and may thus more accurately estimate a location of a target object during a bounding box regression.

In addition, to track a target object, one neural network model selected based on a feature value of a target object obtained from a previous frame may be used, rather than allowing one frame to pass through all the neural network models 330, 340, and 350. Although a plurality of neural network models (for example, the neural network models 330, 340, and 350) are provided, only one of the neural network models 330, 340, and 350 may be used, and it is thus possible to ensure the same processing speed or the same delay time as obtained by providing only a single neural network model.

Figure 4:
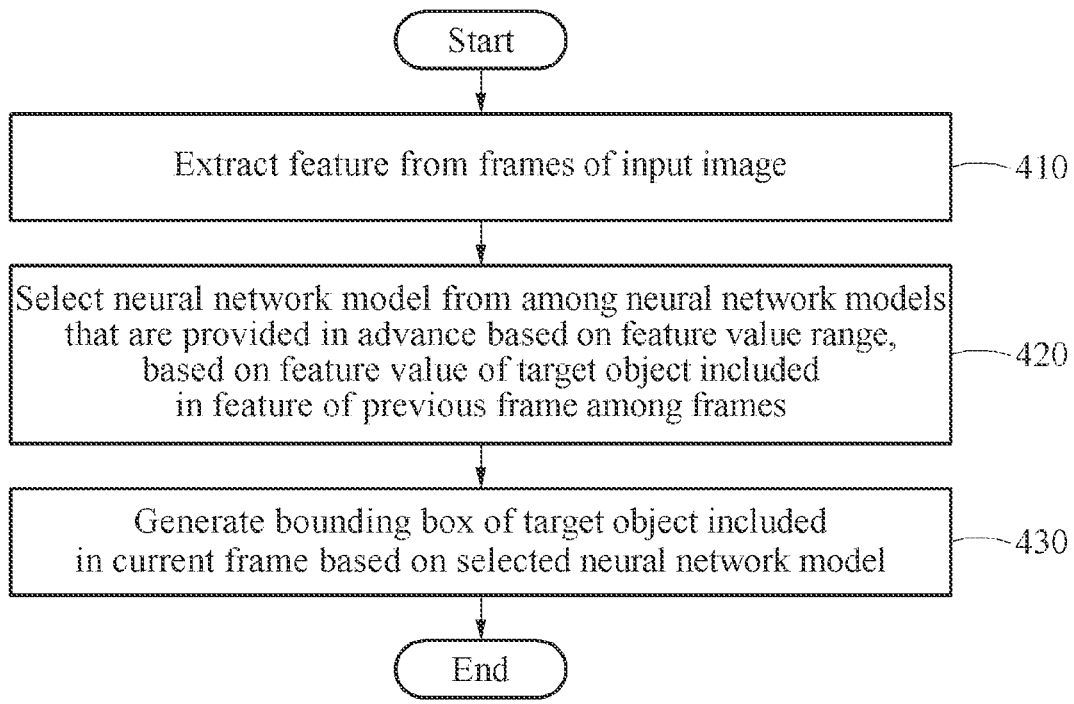
FIG. 4 illustrates an example of a method of tracking a target object.

FIG. 4 illustrates an example of a method of tracking a target object. Operations to be described hereinafter with reference to FIG. 4 may be performed sequentially, but not necessarily be performed sequentially. For example, the order of the operations may be changed, or at least two of the operations may be performed in parallel. Referring to FIG. 4, an object tracking apparatus may track a target object by performing operations 410 through 430.

In operation 410, the object tracking apparatus may extract a feature from frames of an input image. For example, in a case in which a corresponding frame is a first frame including a target object among the frames, the object tracking apparatus may extract, from the first frame, a feature of a cropped image which is an image cropped based on a selection by a user, or a feature of a cropped image which is an image cropped based on ground-truth location information corresponding to the input image. In a case in which the frame is not the first frame including the target object among the frames, the object tracking apparatus may extract a feature of a cropped region which is a region cropped based on a bounding box generated from a previous frame.

For example, when location information (for example, a bounding box) of a target object to be tracked in a certain frame among successive frames of an input image is provided, the object tracking apparatus may generate a cropped image which is an image cropped based on the location information of the target object. The object tracking apparatus may extract the feature by allowing the cropped image to pass through a feature extraction network (e.g., the feature extraction network 310 of FIG. 3), and generate a template or a template feature described above with reference to FIG. 2.

In operation 420, the object tracking apparatus may select one neural network model from among a plurality of neural network models that is provided in advance based on a feature value range, based on a feature value of the target object that is included in the feature of the previous frame among the frames. When selecting the neural network model, the object tracking apparatus may use the feature value of the target object without a change, or may process the feature value of the target object and use the processed feature value.

For example, in operation 420, the object tracking apparatus may process the feature value of the target object. In this example, when the feature value of the target object is an aspect ratio, the object tracking apparatus may process the aspect ratio which is the feature value of the target object to be a ratio between the aspect ratio of the target object and an aspect ratio obtained as a tracking result from the previous frame. In this example, the object tracking apparatus may select one neural network model from among a plurality of neural network models that is provided in advance based on a processed feature value range, based on the processed feature value.

In operation 430, the object tracking apparatus may generate a bounding box of the target object included in a current frame, based on the neural network model selected in operation 420. For example, the object tracking apparatus may crop the current frame and extract a feature (or a feature map) from a cropped image from the current frame, by the neural network model selected in operation 420. The object tracking apparatus may estimate the presence or absence of the target object and a location of the target object by measuring a similarity between the template feature and the feature extracted from the cropped image of the current frame. The object tracking apparatus may measure or calculate the similarity between the template feature and the feature extracted from the cropped image of the current frame, by the neural network model selected in operation 420. The object tracking apparatus may determine the bounding box of the target object that indicates a region matching the template feature in the feature extracted from the cropped image of the current frame, based on the measured similarity. An output of the neural network model selected in operation 420 may be the bounding box corresponding to the location of the target object estimated from the current frame. The location of the target object estimated from the current frame may be used as an input for processing of a subsequent frame.

Figure 5:
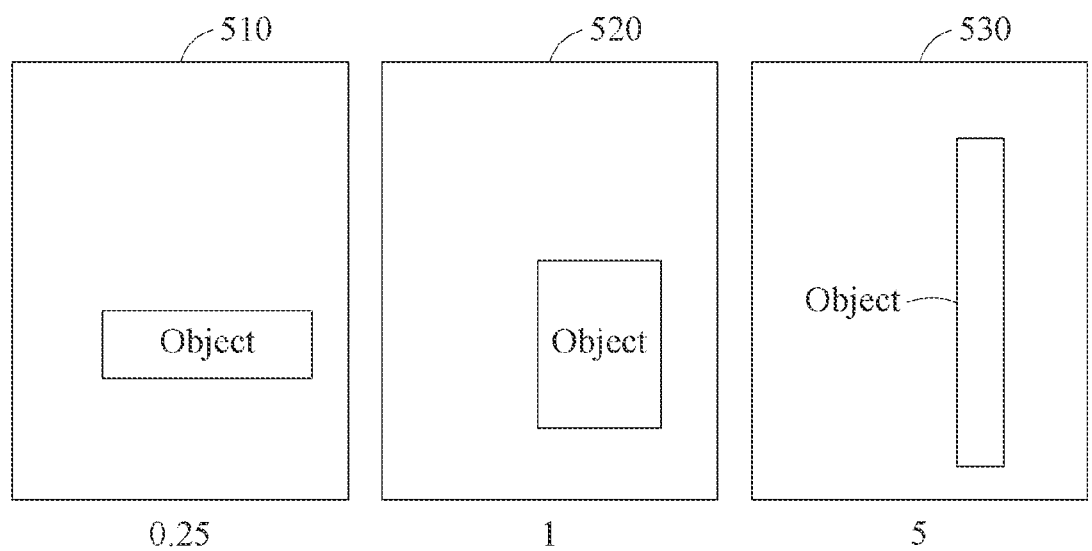
FIG. 5 illustrates examples of target objects with different aspect ratios corresponding to a plurality of neural network models.

FIG. 5 illustrates examples of target objects with different aspect ratios corresponding to a plurality of neural network models. Referring to FIG. 5, objects 510, 520, and 530 may be different in aspect ratio which is one of representative object features.

A feature of a target object may include, for example, a size of the target object, an aspect ratio of the target object, a type of the target object, a degree of a movement change of the target object, a type of a movement of the target object, a color of the target object, a rigidity of the target object, an illumination, and other distinguishable features. The feature of the target object may be a reference that is used to configure a variable network based on an extractable feature from an image frame.

In an example, each of a plurality of neural network models may be trained to process an object (e.g., the object 510, 520, or 530) corresponding to a range of a portion of aspect ratio values. For example, a first neural network model among the neural network models may be trained to process an object corresponding to a range of aspect ratio values greater than 0.05 and less than 1. The first neural network model may process the object 510 having an aspect ratio value of 0.25 as illustrated. A second neural network model among the neural network models may be trained to process an object corresponding to a range of aspect ratio values greater than or equal to 1 and less than 4. The second neural network model may process the object 520 having an aspect ratio value of 1. A third neural network model among the neural network models may be trained to process an object corresponding to a range of aspect ratio values greater than or equal to 4 and less than 8. The third neural network model may process the object 530 having an aspect ratio value of 5.

In an example, by variably selecting a neural network model that is trained to process a target object corresponding to a range of a portion of aspect ratio values and using the selected neural network model, the same processing speed and a higher tracking success rate (or a higher processing speed and the same tracking success rate) may be achieved, compared to using a single neural network model to process all the aspect ratio values. In addition, sharing a backbone network that extracts a feature of an input image may reduce a memory usage rate because a plurality of trackers is not additionally used.

Figure 6:
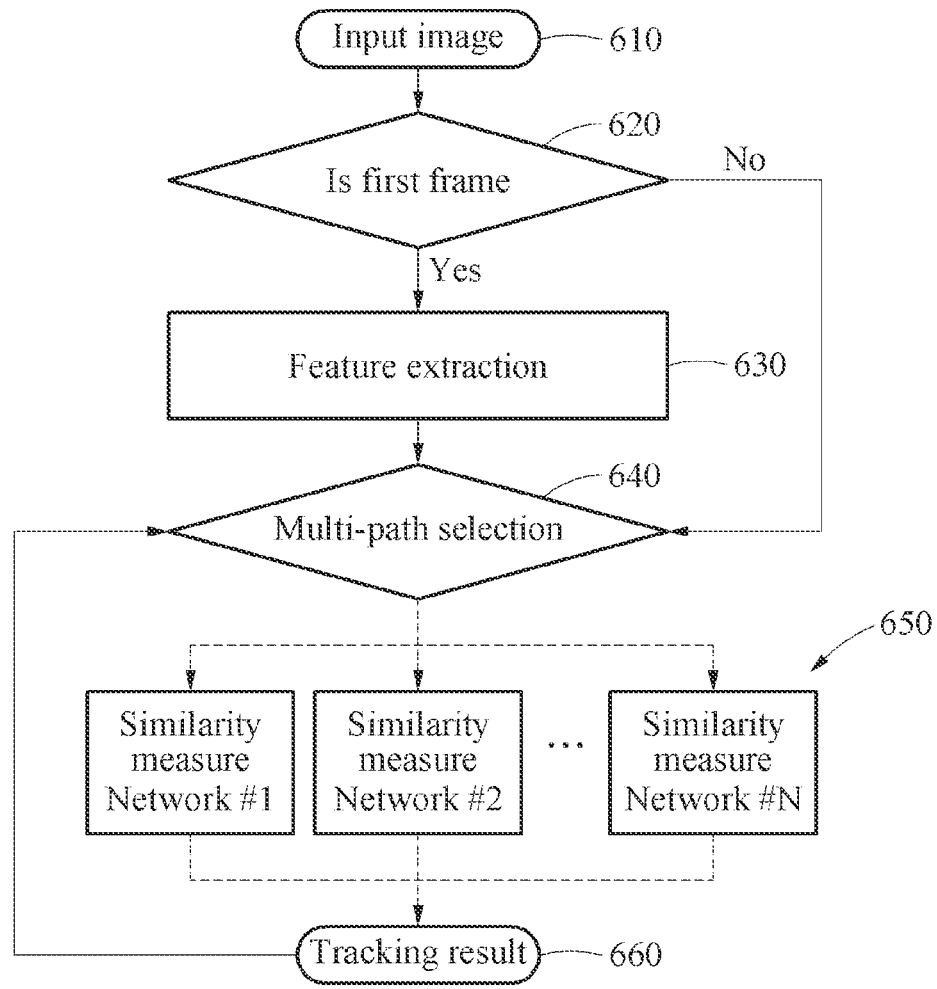
FIG. 6 illustrates another example of a method of tracking a target object.

FIG. 6 illustrates another example of a method of tracking a target object. Operations to be described hereinafter with reference to FIG. 6 may be performed sequentially, but not necessarily performed sequentially. For example, the order of the operations may be changed and at least two of the operations may be performed in parallel.

Referring to FIG. 6, an object tracking apparatus may track a target object by performing operations 610 through 660.

In operation 610, the object tracking apparatus may receive an input image including a plurality of successive frames.

In operation 620, the object tracking apparatus may determine whether a frame received in operation 610 is a first frame among the frames. The first frame may include a feature (e.g., an aspect ratio) of a target object selected as a target to be tracked.

In operation 630, when the received frame is determined to be the first frame, the object tracking apparatus may extract, from the first frame, a feature of a cropped region which is a region cropped based on a selection by a user. In operation 640, the object tracking apparatus may select a neural network model that is to be used for the frame from among a plurality of neural network models 650, using the feature (the aspect ratio) of the target object. The object tracking apparatus may use one neural network model to process one frame.

In contrast, when the received frame is determined not to be the first frame, the object tracking apparatus may extract a feature of a cropped region which is a region cropped based on a bounding box generated from a previous frame in operation 640.

In operation 660, the object tracking apparatus may track the target object using the neural network model selected in operation 640 from among the neural network models 650. A result of the tracking in operation 660 may be transferred to operation 640 and be used to select a neural network model that processes subsequent frames including a second frame.

Figure 7:
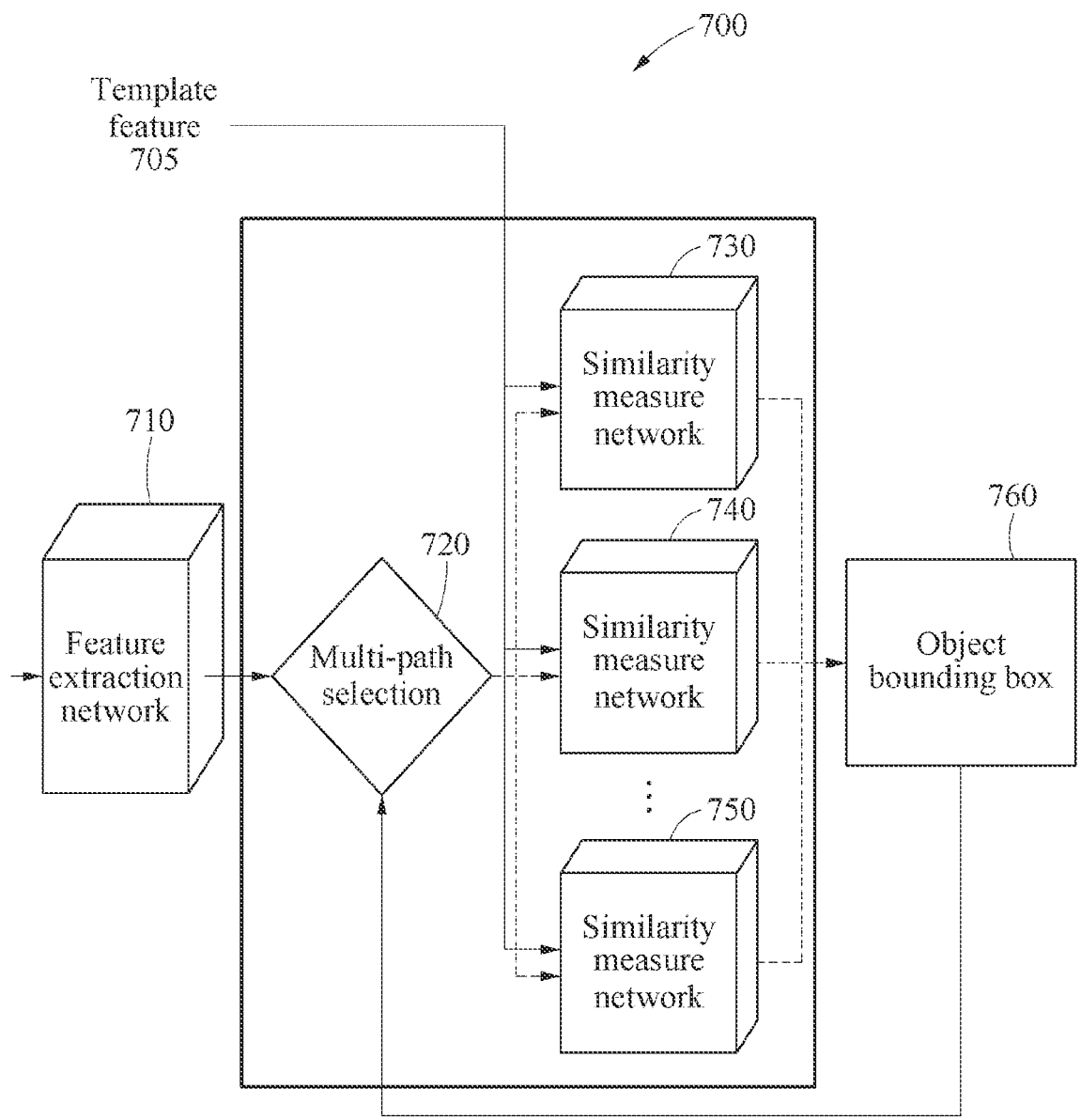
FIG. 7 illustrates an example of a variable network including a plurality of neural network models that tracks a target object.

FIG. 7 illustrates an example of a variable network including a plurality of neural network models that tracks a target object. Referring to FIG. 7, an object tracking apparatus 700 may include a variable network.

The object tracking apparatus 700 may extract a feature from frames of an input image by a feature extraction network 710. The feature extraction network 710 may be a separate neural network that is trained to extract the feature from the frames of the input image, or correspond to a portion of an RPN. The feature extraction network 710 may be shared to extract a feature from each of the frames.

When location information of a target object to be tracked from a certain frame among successive frames of an input image is provided, the object tracking apparatus 700 may generate a cropped image based on the location information of the target object.

In a case in which the frame is a first frame among the frames, the object tracking apparatus 700 may extract a feature by allowing, to pass through the feature extraction network 710, a cropped image corresponding to a selected region that is cropped based on a selection by a user. Alternatively, in a case in which the frame is a second frame or a subsequent frame, the object tracking apparatus 700 may extract a feature by allowing, to pass through the feature extraction network 710, a cropped image which is a region corresponding to the target object cropped based on a bounding box generated from a previous frame. The feature extracted by allowing the first frame or the previous frame to pass through the feature extraction network 710 may be a template feature 705 to be used for similarity measurement in a plurality of neural network models 730, 740, and 750.

The object tracking apparatus 700 may select one neural network model from among the neural network models 730, 740, and 750 that are provided in advance based on a feature value range using a selection circuit 720. The selection circuit 720 may variably select the neural network model to be used for tracking in a current frame based on a feature value of the target object that is included in the feature of the previous frame. The neural network models 730, 740, and 750 may be similarity measure networks that are trained to measure a similarity between the template feature 705 and a feature extracted from a cropped image which is an image cropped from the current frame.

The object tracking apparatus 700 may track the target object through a bounding box 760 corresponding to a location of the target object included in the current frame, based on the neural network model selected by the selection circuit 720. The bounding box 760 may correspond to a tracking result, namely, the location of the target object estimated from the current frame, and may be transferred to the selection circuit 720 for processing of a subsequent frame. The selection circuit 720 may select a neural network model for the subsequent frame based on the feature value of the target object that is based on the location of the target object estimated from the current frame. The selection circuit 720 and the neural network models 730, 740, and 750 may be configured as an RPN.

Figure 8:
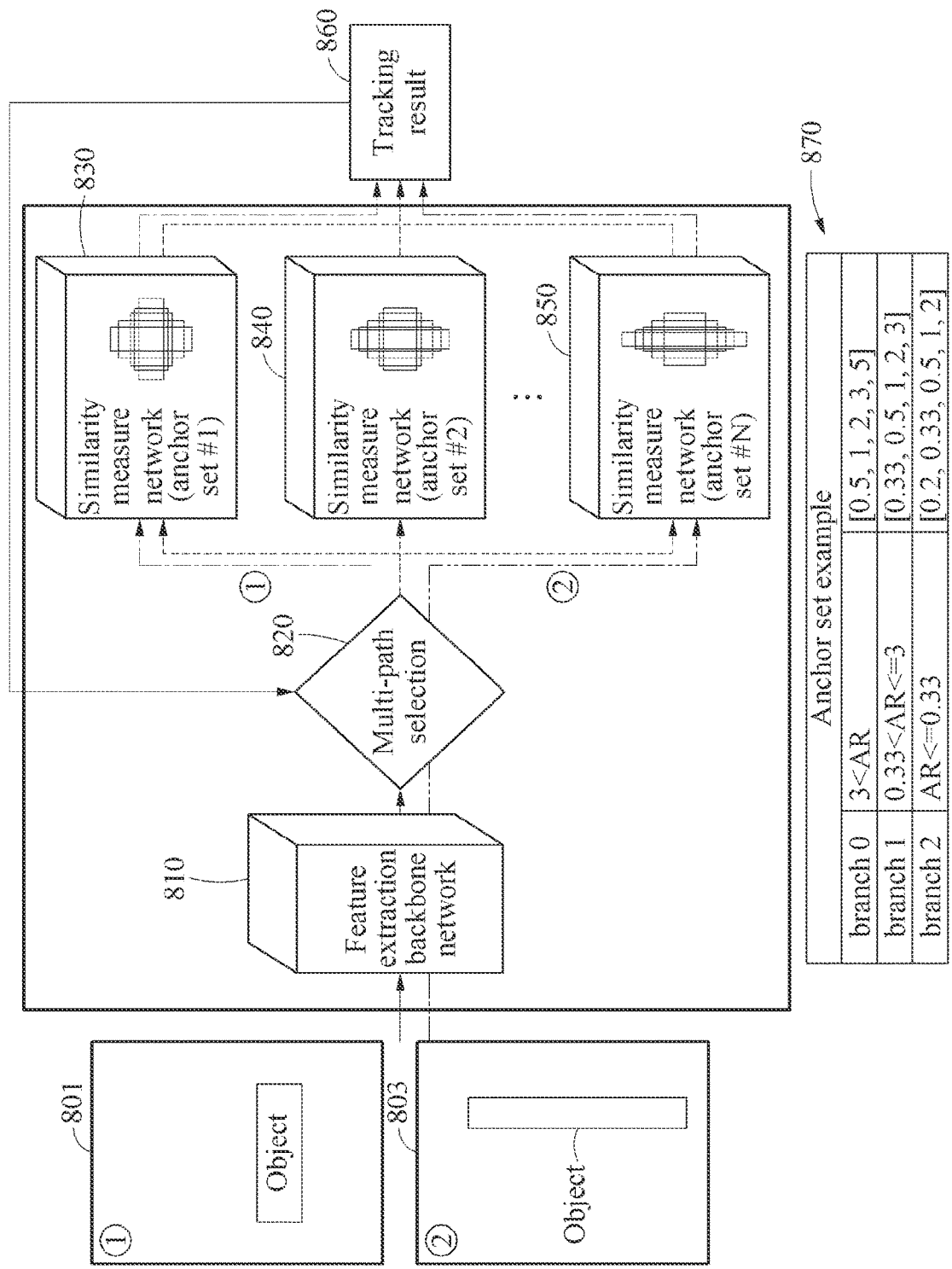
FIG. 8 illustrates an example of tracking target objects having different feature values by a plurality of neural network models.

FIG. 8 illustrates an example of tracking target objects having different feature values by a plurality of neural network models. In the example of FIG. 8, when a first frame 801 including an object having an aspect ratio value of 0.25 and a second frame 803 including an object having an aspect ratio value of 5 are input, an object tracking apparatus may track a target object included in the first frame 801 and the second frame 803 as described hereinafter.

In the example, the first frame 801 may be a first frame of an input image, and the object having the aspect ratio value of 0.25 may be the target object corresponding to an ROI selected by a user.

In this example, when the first frame 801 is input, the object tracking apparatus may crop a region corresponding to the ROI in the first frame 801. The cropped region may include the object having the aspect ratio value of 0.25. The object tracking apparatus may extract a feature from a cropped image corresponding to the ROI by a feature extraction network 810. The extracted feature may include various features included in the cropped image corresponding to the ROI. The extracted feature may be used as a template feature.

A selection circuit 820 may select a neural network model 830 corresponding to a feature value range (e.g., branch 2) from among a plurality of neural network models 830, 840, and 850 that is provided in advance based on a feature (e.g., an aspect ratio), based on a feature value (e.g., an aspect ratio of 0.25) of the target object included in the feature extracted by the feature extraction network 810. A branch condition of the selection circuit 820, for example, a feature value range of anchor sets corresponding to the neural network models 830, 840, and 850, may be provided in advance as indicated in a table 870.

The object tracking apparatus may generate a bounding box based on the neural network model 830, and track the target object having the aspect ratio value of 0.25 that is included in the first frame 801.

The object tracking apparatus may output, as a tracking result 860, a location of the target object estimated by the bounding box that is based on the neural network model 830. The tracking result 860 may be transferred to the selection circuit 820.

Subsequently, when the second frame 803 is input, the object tracking apparatus may extract a feature from the second frame 803 by the feature extraction network 810. The feature extracted from the second frame 803 may include a feature value (e.g., an aspect ratio of 5) of a target object included in the second frame 803.

The object tracking apparatus may select one neural network model from among the neural network models 830, 840, and 850 based on a range of a feature value (e.g., the aspect ratio of 5) of the target object that is included in the feature extracted from the second frame 803. For example, in a case in which the target object included in the first frame 801 and the target object included in the second frame 803 have feature values within the same feature value range of a neural network model, the same neural network model may be selected.

However, in a case in which the target object included in the first frame 801 and the target object included in the second frame 803 have feature values within different feature value ranges of the neural network models as illustrated in FIG. 8, the object tracking apparatus may select the neural network model 850 corresponding to a range (e.g., branch 0 as indicated in the table 870) of the feature value (e.g., the aspect ratio of 5) of the target object included in the second frame 803.

The object tracking apparatus may generate a bounding box of the target object included in the second frame 803 based on the neural network model 850. The object tracking apparatus may estimate whether the target object is present and a location of the target object by measuring a similarity between the template feature and the feature extracted from the second frame 803. The object tracking apparatus may determine the bounding box of the target object that indicates a region matching the template feature in the feature extracted from the second frame 803, based on the measured similarity.

Figure 9:
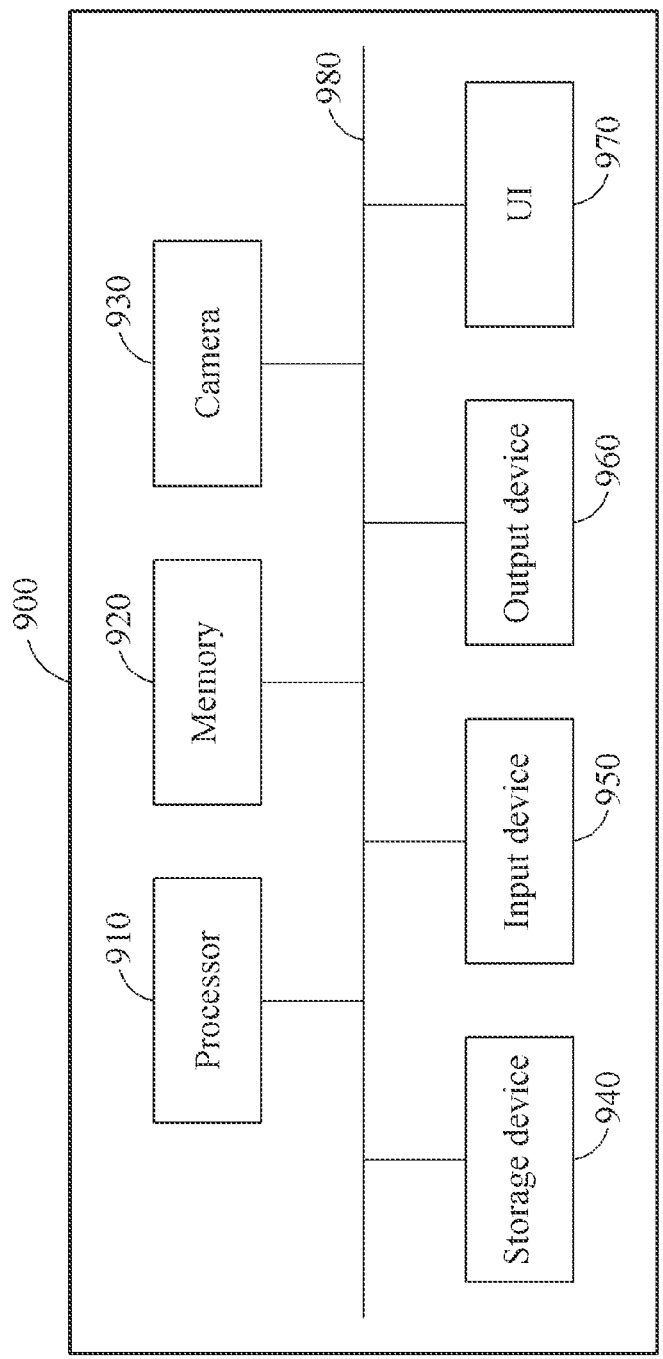
FIG. 9 illustrates an example of an electronic apparatus.

FIG. 9 illustrates an example of an electronic apparatus. Referring to FIG. 9, an electronic apparatus 900 may obtain an input image and track an object in the obtained input image. The electronic apparatus 900 may also perform operations associated with the tracked object. The electronic apparatus 900 may include, structurally and/or functionally, the object tracking apparatus 100 of FIG. 1.

The electronic apparatus 900 includes a processor 910 (e.g., one or more processors), a memory 920 (e.g., one or more memories), a camera 930, a storage device 940, an input device 950, an output device 960, and a user interface (UI) 970, which may communicate with one another through a communication bus 980. For example, the electronic apparatus 900 may be provided as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), an advanced driver assistance system (ADAS), a head-up display (HUD) device, a three-dimensional (3D) digital information display (DID), a navigation device, a neuromorphic device, a smart appliance (e.g., a smart television (TV), a smart refrigerator, a smart washing machine, etc.), a smart vehicle, an internet of things (IoT) device, a medical device, a measurement device, and the like.

The processor 910 may extract a feature from frames of an input image. The processor 910 may select one neural network model from among a plurality of neural network models that is provided in advance based on a feature value range, based on a feature value of a target object that is included in a feature of a previous frame. The processor 910 may track the target object using a bounding box of the target object in a current frame that is generated based on the selected neural network model.

The processor 910 may execute functions and instructions to be executed in the electronic apparatus 900. For example, the processor 910 may process instructions stored in the memory 920 or the storage device 940. The processor 910 may also perform other operations described above with reference to FIGS. 1 through 8.

The memory 920 may store data for object tracking. The memory 920 may store the neural network models. The memory 920 may include a computer-readable storage medium or device. The memory 920 may store instructions to be executed by the processor 910 and store related information during the execution of software and/or application by the electronic apparatus 900.

The camera 930 may generate the input image based on sensed visual information. The camera 930 may capture a still image and/or a moving image (or a video). For example, the camera 930 may capture an image of a user including a body and/or face of the user. The camera 930 may be a 3D camera configured to provide a 3D image including depth information of objects.

The storage device 940 may include a computer-readable storage medium or device. The storage device 940 may store various sets of data used for object tracking. The storage device 940 may store a greater amount of information than the memory 920 and store the information for a long period of time. The storage device 940 may include, for example, a magnetic hard disk, an optical disc, a flash memory, a floppy disc, or other types of nonvolatile memory known in the relevant technical field.

The input device 950 may receive an input from a user through a traditional input method using a keyboard and a mouse, or through a new input method using a touch input, a voice input, and an image input. The input device 950 may include, for example, a keyboard, a mouse, a touchscreen, a microphone, or other devices that detect an input from a user and transfer the detected input to the electronic apparatus 900.

The output device 960 may provide an output of the electronic apparatus 900 to a user through a visual, auditory, or tactile channel. The output device 960 may include, for example, a display, a touchscreen, a speaker, a vibration generator, or other devices that provide an output of the electronic apparatus 900 to a user. The UI 960 may receive a selection of a target object included in an input image from a user. Although not illustrated, the electronic apparatus 900 may further include a communication interface that communicates with an external device through a wired or wireless network.

The object tracking apparatuses, communication interfaces, processors, memories, selection circuits, electronic apparatuses, cameras, storage devices, input devices, output devices, UIs, communication buses, object tracking apparatus 100, communication interface 110, processor 130, memory 150, object tracking apparatus 300, selection circuit 320, object tracking apparatus 700, selection circuit 720, selection circuit 820, electronic apparatus 900, processor 910, memory 920, camera 930, storage device 940, input device 950, output device 960, UI 970, communication bus 980, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of tracking a target object, comprising:
    extracting a feature from frames of an input image;
    selecting a neural network model from among a plurality of neural network models provided in advance based on a feature value range, based on a feature value of a target object that is included in the feature of a previous frame among the frames; and
    generating a bounding box of the target object included in a current frame among the frames, based on the selected neural network model.

2. The method of claim 1, wherein the extracting of the feature comprises:
    in response to the current frame being a first frame including the target object among the frames, extracting, from the first frame, a feature of a region cropped based on a selection by a user.

3. The method of claim 1, wherein the extracting of the feature comprises:
    in response to the current frame not being a first frame including the target object among the frames, extracting, from the current frame, a feature of a region cropped based on a bounding box generated from the previous frame.

4. The method of claim 1, wherein the feature value of the target object corresponds to any one or any combination of any two or more of a size of the target object, an aspect ratio of the target object, a type of the target object, a degree of a movement change of the target object, a type of a movement of the target object, a color of the target object, a rigidity of the target object, and an intensity of illumination.

5. The method of claim 1, wherein the selecting of the neural network model comprises:
    processing the feature value of the target object; and
    selecting, based on the processed feature value, the neural network model from among the plurality of neural network models provided in advance based on the feature value range that is a processed feature value range.

6. The method of claim 1, wherein the selected neural network model is configured to process a target object corresponding to a range of a portion of feature values of the target object.

7. The method of claim 1, wherein the generating of the bounding box of the target object comprises:
    cropping the current frame using the selected neural network model;
    determining a similarity between a template feature that is based on the feature extracted from the previous frame and a feature that is extracted from a cropped image of the current frame, using the selected neural network model; and
    determining a bounding box of the target object that indicates a region matching the template feature in the feature extracted from the cropped image of the current frame, based on the similarity.

8. The method of claim 1, wherein the neural network models comprise:
    a first neural network model trained to determine a target object corresponding to a first feature value range;
    a second neural network model trained to determine a target object corresponding to a second feature value range; and
    a third neural network model trained to determine a target object corresponding to a third feature value range.

9. The method of claim 8, wherein the first feature value range, the second feature value range, and the third feature value range differ from one another.

10. The method of claim 1, further comprising:
    receiving, as an input, a selection of the target object from a user.

11. A non-transitory computer-readable storage medium storing instructions that, when executed by a processor, configure the processor to perform the method of claim 1.

12. An apparatus for tracking a target object, comprising:
    a communication interface configured to obtain an input image; and
    a processor configured to
        extract a feature from frames of the input image,
        select a neural network model from among a plurality of neural network models provided in advance based on a feature value range using a feature value of a target object included in a feature of a previous frame among the frames, and
        generate a bounding box of the target object included in a current frame among the frames using the selected neural network model.

13. The apparatus of claim 12, wherein, for the extracting of the feature, the processor is configured to:
    in response to the current frame being a first frame including the target object among the frames, extract, from the first frame, a feature of a region cropped based on a selection by a user.

14. The apparatus of claim 12, wherein, for the extracting of the feature, the processor is configured to:
    in response to the current frame not being a first frame including the target object among the frames, extract, from the current frame, a feature of a region cropped based on a bounding box generated from the previous frame.

15. The apparatus of claim 12, wherein, for the selecting of the neural network model, the processor is configured to:
    process the feature value of the target object; and
    select, based on the processed feature value, the neural network model from among the plurality of neural network models provided in advance based on the feature value range that is a processed feature value range.

16. The apparatus of claim 12, wherein
    the neural network models comprise a first neural network model trained to determine a target object corresponding to a first feature value range, a second neural network model trained to determine a target object corresponding to a second feature value range, and a third neural network model trained to determine a target object corresponding to a third feature value range, and the first feature value range, the second feature value range, and the third feature value range differ from one another.

17. The apparatus of claim 12, wherein, for the generating of the bounding box of the target object, the processor is configured to:

crop the current frame using the selected neural network model;

determine a similarity between a template feature that is based on the feature extracted from the previous frame and a feature that is extracted from a cropped image of the current frame, using the selected neural network model; and determine the bounding box of the target object that indicates a region matching the template feature in the feature extracted from the cropped image of the current frame based on the determined similarity.

18. The apparatus of claim 12, wherein the apparatus is an electronic apparatus comprising:

a camera configured to generate the input image; and a user interface (UI) configured to receive, as an input, a selection of the target object included in the input image from a user.

19. An electronic apparatus, comprising:

a camera configured to generate an input image based on sensed visual information;

a user interface (UI) configured to receive, as an input, a selection of a target object included in the input image from a user; and a processor configured to extract a feature from frames of the input image, select a neural network model from among a plurality of neural network models provided in advance based on a feature value range using a feature value of the target object included in a feature of a previous frame among the frames, and track the target object using a bounding box of the target object included in a current frame that is generated using the selected neural network model.

20. The electronic apparatus of claim 19, wherein, for the extracting of the feature, the processor is configured to:

in response to the current frame being a first frame including the target object among the frames, extract, from the first frame, a feature of a region cropped based on a selection by the user; and in response to the current frame not being the first frame including the target object among the frames, extract, from the current frame, a feature of a region cropped based on a bounding box generated from the previous frame.

21. The electronic apparatus of claim 19, wherein, for the generating of the bounding box of the target object, the processor is configured to:

crop the current frame using the selected neural network model;

determine a similarity between a template feature that is based on the feature extracted from the previous frame and a feature that is extracted from a cropped image of the current frame, using the selected neural network model; and determine the bounding box of the target object that indicates a region matching the template feature in the feature extracted from the cropped image of the current frame based on the determined similarity.

22. A processor-implemented method of tracking a target object, comprising:

determining a first feature value of a target object included in a first image frame;

selecting, from a plurality of neural network models trained for respective feature value ranges, a neural network model trained for a feature value range corresponding to the first feature value; and determining location information of the target object included in a second image frame using the selected neural network model.

23. The method of claim 22, wherein the determining of the location information comprises:

determining a second feature value of the target object included in the second image frame;

determining, using the selected neural network model, a similarity between the first feature value and the second feature value; and determining the location information based on the similarity.

24. The method of claim 22, wherein the location information corresponds to a bounding box of the target object in the second image frame, and the feature value corresponds to an aspect ratio of a bounding box of the target object in the first image frame.

* * * * *